(12) United States Patent
Yamada (10) Patent No.: US 8,743,401 B2
(45) Date of Patent: Jun. 3, 2014

(54) PRINTING APPARATUS AND PRINTING SYSTEM

(75) Inventor: Akihiro Yamada, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 136 days.

(21) Appl. No.: 13/407,030

(22) Filed: Feb. 28, 2012

(65) Prior Publication Data

US 2013/0003113 A1 Jan. 3, 2013

(30) Foreign Application Priority Data

Jun. 28, 2011 (JP) ................................. 2011-142775

(51) Int. Cl.
- *G06F 3/12* (2006.01)
- *G06F 3/00* (2006.01)
- *G06F 13/00* (2006.01)
- *G06F 15/00* (2006.01)

(52) U.S. Cl.
USPC ........................... 358/1.15; 358/1.1; 358/1.13

(58) Field of Classification Search
CPC ..... G06F 3/122; G06F 3/1267; G06F 3/1274; G06F 3/1285; G06F 3/129
USPC .................. 358/1.1–1.9, 1.11–1.18
See application file for complete search history.

(56) References Cited

U.S. PATENT DOCUMENTS

| | | | | |
|---|---|---|---|---|
| 8,526,031 B2 * | 9/2013 | Ikemoto | ....................... | 358/1.14 |
| 2007/0113246 A1 * | 5/2007 | Xiong | .............................. | 725/39 |
| 2008/0075203 A1 * | 3/2008 | Li | ................................... | 375/341 |
| 2009/0284785 A1 | 11/2009 | Bando | | |
| 2010/0277612 A1 * | 11/2010 | Weber | ........................ | 348/231.2 |

FOREIGN PATENT DOCUMENTS

| | | | |
|---|---|---|---|
| JP | 2001-282477 | | 10/2001 |
| JP | 2008-205533 | * | 9/2008 |
| JP | 2008-205533 A | | 9/2008 |
| JP | 2008-205553 | | 9/2008 |
| JP | 2009-274242 | | 11/2009 |

* cited by examiner

*Primary Examiner* — King Poon
*Assistant Examiner* — Ibrahim Siddo
(74) *Attorney, Agent, or Firm* — Scully, Scott, Murphy & Presser, P.C.

(57) ABSTRACT

A printing apparatus which is configured to communicate with an external device and performs printing includes: a receiving section which receives a printing job from the external device; a storage section in which the printing job is stored; an input section which accepts a printing instruction; a printing section which performs the printing based on the printing job when the input section accepts the printing instruction; a judgment section which judges whether or not the printing job is a deletion-objective job to be deleted from the storage section; a determining section which determines a transmission mode based on at least one of transmission setting and transmission content of the deletion-objective job, when the judgment section judges that the printing job is the deletion-objective job; a transmission section which transmits the deletion-objective job to the external device; and a deleting section which deletes the deletion-objective job from the storage section.

8 Claims, 7 Drawing Sheets

PRINTING APPARATUS AND PRINTING SYSTEM

CROSS REFERENCE TO RELATED APPLICATION

The present application claims priority from Japanese Patent Application No. 2011-142775, filed on Jun. 28, 2011, the disclosure of which is incorporated herein by reference in its entirety.

BACKGROUND OF THE INVENTION

1. Field of the Invention

The present invention relates to a printing apparatus and a printing system and in particular, to a printing apparatus and a printing system which stores a printing job in a storage section of the printing apparatus and performs printing of the printing job when a printing instruction by a user is accepted.

2. Description of the Related Art

There has been known a remote printing technique in which a printing job having a printing time-period is stored in a storage section of a printing apparatus and then printing is started when a user carries out a printing instruction of the printing job to the printing apparatus. The printing apparatus deletes the printing job from the storage section when the printing time-period of the printing job elapses (expires). In the recent years, the printing apparatus as described above is widely used with the popularization of public wireless LAN service. For example, the printing job is stored, in advance, in the printing apparatus of a public facility such as a railroad station, an airport, etc., and thereby making it possible for the user to obtain a printed matter of the printing job there.

For example, Japanese Patent Application Laid-open No. 2008-205533 discloses the printing apparatus as described above. In Japanese Patent Application Laid-open No. 2008-205533, it is disclosed that a job is registered in the storage section of a printer, judgment is performed as to whether or not the job registered is stored for a certain period of time, and the job is deleted from the storage section in a case that the job is stored for the certain period of time. Further, Japanese Patent Application Laid-open No. 2008-205533 discloses that an image data of the job to be deleted is transmitted, before the deletion of the job from the storage section, to an address corresponding to a user of the job via an e-mail (electronic mail) to prevent loss of the image data.

However, there is generated a problem in the conventional printing apparatus described above such that the image data is not always successfully transmitted depending on a transmission mode. For example, in a case that data amount (data size) attachable to the e-mail is limited and that the data amount of the image data attached exceeds the limit, the image data can not be transmitted. Therefore, there is scope to improve the technique for preventing the loss of the image data registered in the printing apparatus.

The present teaching has been made in order to solve the problem as described above, an object of which is to provide a printing apparatus and a printing system which appropriately prevents loss of an image data registered in the printing apparatus.

SUMMARY OF THE INVENTION

According to the first aspect of the present teaching, there is provided a printing apparatus which is configured to communicate with an external device and performs printing, the apparatus including: a receiving section which receives a printing job from the external device; a storage section in which the printing job received by the receiving section is stored; an input section which accepts a printing instruction to perform the printing based on the printing job stored in the storage section; a printing section which performs the printing based on the printing job stored in the storage section in a case that the input section accepts the printing instruction; a judgment section which judges as to whether or not the printing job stored in the storage section is a deletion-objective job which is to be deleted from the storage section before the input section accepts the printing instruction; a determining section which makes a determination of a transmission mode, from among a plurality of transmission modes for transmitting the deletion-objective job, based on at least one of a transmission setting and a transmission content of the deletion-objective job, in a case that the judgment section judges that the printing job stored in the storage section is the deletion-objective job; a transmission section which performs a transmission of the deletion-objective job to the external device in accordance with the determination of the determining section; and a deleting section which deletes the deletion-objective job, which is transmitted by the transmission section, from the storage section.

The printing apparatus according to the first aspect of the present teaching stores the printing job in the storage section and starts the printing of the printing job when the printing instruction of the printing job is accepted by the input section. Further, in the printing apparatus of the present teaching, in a case that the judgment section judges that the printing job stored in the storage section is the deletion-objective job, which is to be deleted from the storage section before the printing instruction is accepted, the determining section makes the determination of the transmission mode of the deletion-objective job based on at least one of the transmission setting and the transmission content of the deletion-objective job. The transmission setting is a setting with respect to an act of the transmission which is not directly related to the content of transmission data. For example, a transmission means such as an e-mail, FTP, and a setting of a destination such as an apparatus name, an IP address are applicable to the transmission setting. Further, the transmission content is a setting with respect to the content of the transmission data. For example, a name, a type, and a data size of a file, which is a transmission objective, are applicable to the transmission content. The deletion-objective job is transmitted to the external device in accordance with the determination. Here, for example, a printer server, an apparatus from which the printing job is entered are applicable to the "external device".

In the printing apparatus of the present teaching, in a case that the printing job (deletion-objective job) is transmitted, the transmission mode which is appropriate for the printing job (that is, as to where the destination is, what kind of transmission means is used, and what kind of data is transmitted) is determined based on at least one of the transmission setting and the transmission content. For example, in a case that the transmission means for the printing job is an e-mail, a data amount to be transmitted is made to be small. Or, the data to be transmitted is transmitted by being divided based on a predetermined data size or a predetermined page unit. Further, for example, in a case that the data size of the data to be transmitted is greater than the predetermined value, the transmission by the e-mail is prohibited. By doing so, it is possible to reduce a risk for causing the transmission error of the printing job.

According to the second aspect of the present teaching, there is provided a printing system including: a printing apparatus which is configured to store a printing job, and configured to perform printing so that the printing of the printing job is started upon acceptance of a printing instruction of the printing job; an information process apparatus which transmits the printing job to the printing apparatus; and an external device including: a receiving section which receives the printing job; and a storage section in which the printing job received by the receiving section is stored, wherein the printing apparatus, the information process apparatus, and the external device are coupled via a network; the information process apparatus includes a transmission section which transmits, to the printing apparatus, the printing job to which an information of at least one of a transmission content and a transmission setting of the printing job is added; and the printing apparatus includes: a receiving section which receives the printing job transmitted by the transmission section of the information process apparatus; a storage section in which the printing job received by the receiving section is stored; an input section which accepts the printing instruction to perform the printing based on the printing job stored in the storage section; a printing section which performs the printing based on the printing job stored in the storage section in a case that the input section accepts the printing instruction; a judgment section which judges as to whether or not the printing job stored in the storage section is a deletion-objective job which is to be deleted from the storage section before the input section accepts the printing instruction; a determining section which makes a determination of a transmission mode, from among a plurality of transmission modes for transmitting the deletion-objective job, based on at least one of the transmission setting and the transmission content of the deletion-objective job, in a case that the judgment section judges that the printing job stored in the storage section is the deletion-objective job; a transmission section which performs a transmission of the deletion-objective job to the external apparatus or the information process apparatus in accordance with the determination of the determining section; and a deleting section which deletes the deletion-objective job, which is transmitted by the transmission section of the printing apparatus, from the storage section.

According to the second aspect of the present teaching, the printing system which appropriately prevents loss of an image data stored in the printing apparatus is realized.

According to a third aspect of the present teaching, there is provided a printing apparatus which is configured to communicate with an external device and performs printing on a medium, the apparatus including: a communication section which is configured to communicate with the external device; a storage section which is configured to store a printing job; a printing section which is configured to perform the printing on the medium based on the printing job stored in the storage section; and a controller which is configured to control the communication section, the storage section, and the printing section, wherein in a case that the communication section transmits the printing job stored in the storage section to the external device, the controller performs steps including: a judgment step for judging as to whether a setting of a transmission method included in the printing job is a first transmission method or a second transmission method which has a transmission capacity greater than that of the first transmission method; a first transmission step for transmitting the printing job by the first transmission method to the external device via the communication section, under a condition that the controller judged that the setting of the transmission method included in the printing job is the first transmission method in the judgment step; a re-transmission step for transmitting the printing job by the second transmission method to the external device via the communication section, under a condition that the communication section receives a transmission error of the printing job after the first transmission step; and a second transmission step for transmitting the printing job by the second transmission method to the external device via the communication section, under a condition that the controller judged that the setting of the transmission method included in the printing job is the second transmission method in the judgment step.

DESCRIPTION OF THE PREFERRED EMBODIMENTS

An explanation will be made in detail with reference to the accompanying drawings about embodiments in which a printing apparatus according to the present teaching is embodied. In this embodiment, the present teaching is applied to a printer connected to a server.

(Structure of Printer)

Figure 1:
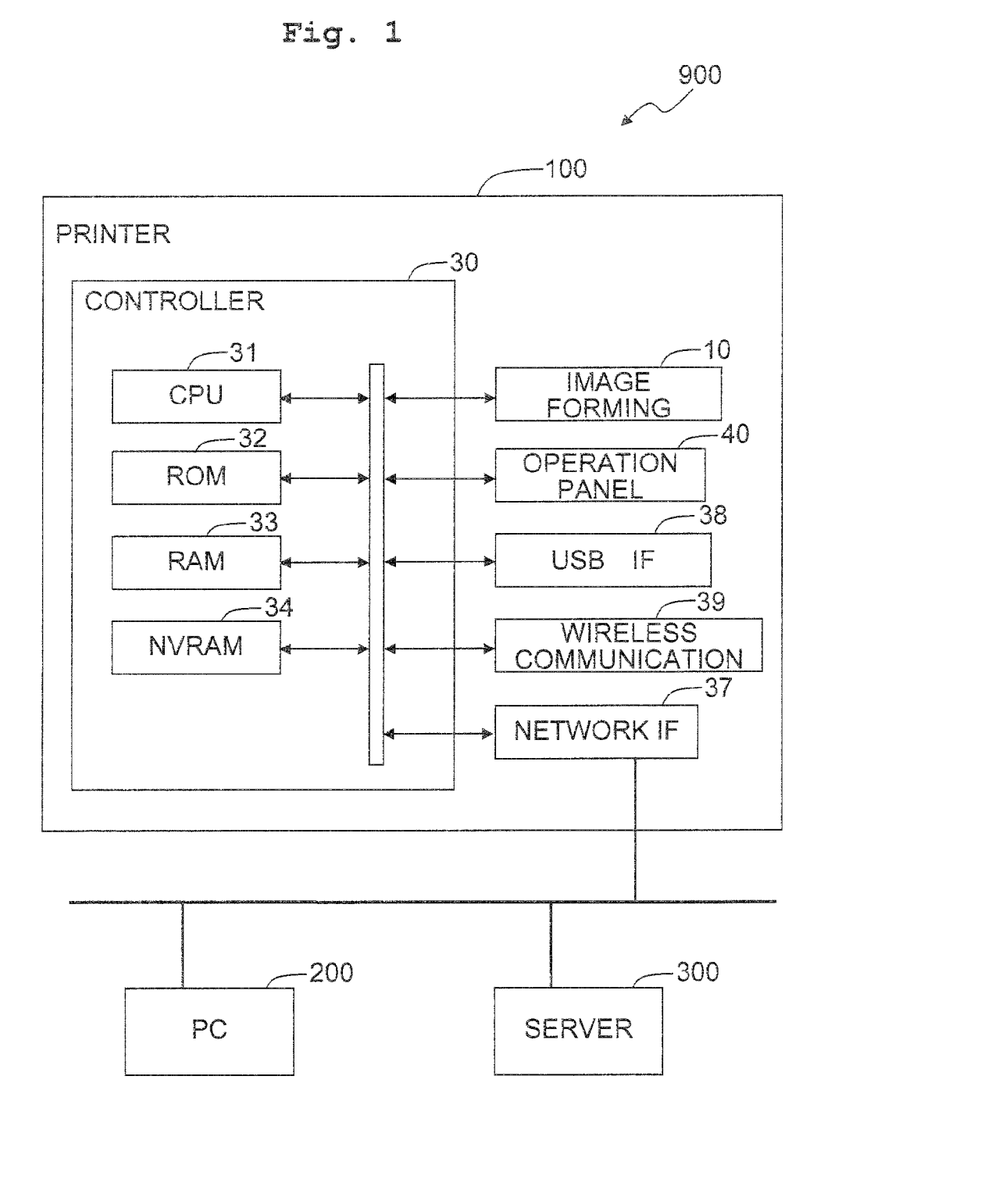
FIG. 1 is a block diagram showing an electrical structure of a printer according to an embodiment.

As shown in FIG. 1, a printer 100 (an example of a printing apparatus) according to this embodiment includes a controller 30 provided with a CPU 31, a ROM 32, a RAM 33, and a NVRAM (non-volatile RAM) 34. Further, the controller 30 is electrically connected to an image forming section 10 which prints an image on a paper sheet, an operation panel 40 on which an operation state is displayed and through which an input operation by a user is accepted, a network interface 37, a USB interface 38, and a wireless communication interface 39.

The ROM 32 stores firmware which is a control program for controlling the printer 100, various settings, an initial value, etc. The RAM 33 and the NVRAM 34 are utilized as a work area at which the various control programs are read or as a storage area which temporarily stores image data.

The CPU 31 (an example of a judgment section, a determining section, a transmission section, a deleting section, a transmission result judgment section, a re-transmission section, and a reporting section) controls each component of the printer 100, while storing, in the RAM 33 or the NVRAM 34, a processing result processed in accordance with the control program read from the ROM 32 and/or a signal from each of the sensors.

The network interface 37, the USB interface 38, and the wireless communication interface 39 are interfaces which make it possible to communicate the printer with any other apparatus. The printer 100 receives a printing job transmitted from any other apparatus via these interfaces. In this embodiment, the printer 100 communicates with a personal computer (PC) 200 (an example of an information process apparatus and an external device) and a server 300 (an example of an external device) via the network interface 37. In addition to that, the printer may communicate with any other apparatus via the USB interface 38 or the wireless communication interface 39.

The image forming section 10 (an example of a printing section) may be any, provided that the image can be printed on the paper sheet. The image forming system of the image forming section 10 may be either the electro photography system or the ink-jet system. Further, the image forming section 10 may form either a color image or a monochrome (black and white) only.

The operation panel 40 includes various buttons through which the input operation by the user is accepted and a liquid crystal display on which character information is displayed. The various buttons include, for example, a button through which the user carries out instruction to execute the printing and a cancel button through which the user carries out instruction to cancel the printing operation.

(Structure of Printing System)

Figure 2:
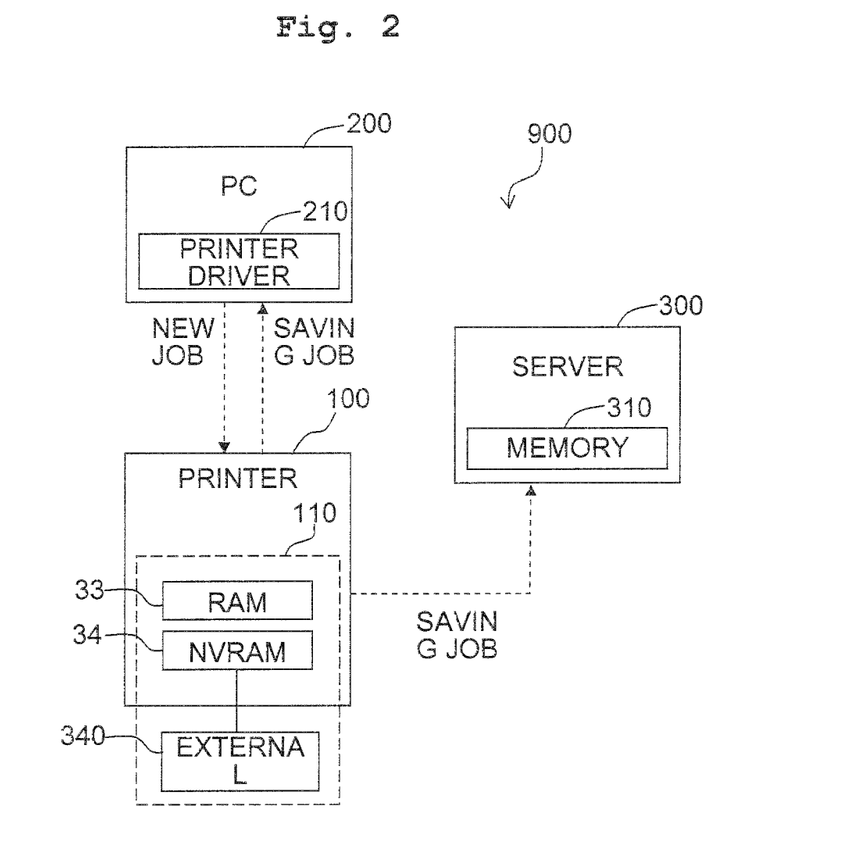
FIG. 2 is a block diagram schematically showing operation of a printing system according to the embodiment.

Subsequently, an explanation will be made with reference to FIG. 2 about the structure and operation of a printing system 900 which includes the printer 100. In FIG. 2, the printing system 900 is configured to include the printer 100, the PC 200, and the server 300 only, in order to simplify the explanation. However, the components of the printing system 900 are not limited thereto. The printing system 900 may include any other information process apparatus.

In the printing system 900, when the PC 200 accepts the printing instruction from the user, a printer driver 210 creates a printing job. Then, the printing job is entered into (transmitted to) the printer 100 from the PC 200. The printing job includes, in addition to the printing data as the print objective, information to identify the printing job, information to identify the user who enters the job, the expiration date of printing (print expiration date), and saving information. The print expiration date and the saving information may be set by the input operation of the user or may be set by the printer driver 210 automatically.

The saving information described above is information to save the printing job stored in the printer 100 in an apparatus other than the printer 100. The saving information includes, for example, a transmission method, a destination, a transmittable file format, and a setting of prohibition of deletion. The transmission method includes a transmission means such as the e-mail, file transfer protocol (FTP), and any one of the transmission means is set as the transmission method. The destination includes an e-mail address, an IP address, an apparatus name, etc., and any one of them is set as the destination in accordance with the transmission method. The transmittable file format includes PDL data, PDF data, bitmap image data, etc., and any one of them is set as the transmittable file format. The setting of prohibition of deletion is a setting as to whether or not the deletion, of the printing job which is left in the printer 100 after saving, is prohibited. Details of the saving of the printing job will be described later.

The respective pieces of information included in the saving information, as described above, may be set as needed, or the respective pieces of information may not be set. In a case that the saving information is not set, the saving information per se may not be added to the printing job. In a case that the saving information is not added to the printing job or a part of the saving information is not set, the printer 100, in which the printing job is stored, automatically sets the saving information at the time of the saving of the printing job in an external device.

When the printer 100 receives the printing job, the printing job is stored in a memory area (memory region) 110 (an example of a storage section) reserved for storing the printing job. The memory area 110 is configured to include the RAM 33 and/or the NVRAM 34. In a case that an external memory 340 such as a USB memory, an external hard disk drive (HDD), is connected to the printer 100, a memory area reserved for the external memory may be included in the memory area 110. Printing data stored in the memory area 110 may be image information data (for example, PDL data or PDF data) which is not yet expanded as the bitmap image data or image-expanded data which has been expanded. Alternatively, both the image information data and the image-expanded data may be stored in the memory area 110. In this embodiment, both the image information data and the image-expanded data are stored in the memory area 110. It is noted that the memory area 110 is used for not only the storage of the printing job as described above but also the process executed in the printer 100, for example, image processing and transmission/reception of the printing job.

After the printing job is stored in the memory area 110, the printer 100 comes into a standby state in which the printer 100 waits for the input of the printing instruction of the printing job. That is, the printer 100 does not start the printing of the printing job at a stage when the printer 100 received the printing job.

After the user entered the printing job into the printer 100, the user moves to a place at which the printer 100 is provided. Then, the user operates the operation panel 40 of the printer 100 and inputs the printing instruction of the printing job stored in the memory area 110. The printer 100 starts the printing of the printing job corresponding to the printing instruction upon acceptance of the printing instruction. Since the printing job as the print objective is stored in the memory area 110 of the printer 100, the printer 100 is capable of starting the printing early as compared with those in which the printing job as the print objective is received on each printing instruction from the server 300 etc.

When amount of space (free space) of the memory area 110 is not sufficient, the printer 100 extracts the printing job, from among the printing jobs stored in the memory area 110, which satisfies a predetermined condition, to save the extracted printing job (hereinafter referred to as a "saving job") in a storage area (for example, a memory 310 of the server 300) of the designated destination apparatus. That is, the saving job is transmitted to the designation apparatus and then the saving job is deleted from the memory area 110. By deleting the saving job from the memory area 110, the free space of the memory area 110 is reserved.

Further, the printer 100 controls the print expiration date of the printing job stored in the memory area 110. The printer 100 transmits the printing job (hereinafter referred to as an "expired job"), the print expiration date of which has passed, to the designated destination apparatus as the saving job. Then, the printer 100 deletes the saving job (expired job) from the memory area 110. By deleting the expired job from the memory area 110, a situation in which the memory area 110 is utilized by useless printing job for a long period of time is avoided.

The printer 100 determines a transmission content which is transmitted to the destination apparatus, depending on a transmission setting such as the transmission method, the destination. Alternatively, the printer 100 determines the transmission setting used for the transmission to the destination apparatus, depending on the transmission content such as the type and the data size of the file, which is the transmission objective. The determining method will be specifically explained later on.

It is noted that the destination apparatus transmits the saving job stored in the memory of the destination apparatus back to the printer 100, when a predetermined condition is satisfied. The predetermined condition corresponds to, for example, the input of transmission instruction by the user and the receipt of transmission request sent from the printer 100. The transmission request from the printer 100 is outputted, for example, when the free space of not less than a predetermined value is reserved in the memory area 110.

First Embodiment

Subsequently, an explanation will be made about the control of the printing system 900 described above. As described above, the printer 100 transmits the saving job in the case that the shortage of the free space of the memory area 110 is detected and that the printing job stored in the memory area 110 is the expired job. Hereinbelow, an explanation will be given while being divided into the above two cases.
(Memory Control Process)

At first, an explanation will be made with reference to the flowchart of FIG. 3 about a memory control process (an example of processes performed by the judgment section, the determining section, the transmission section, and the deleting section) in which the free space of the memory area 110 of the printer 100 is controlled. The memory control process is executed periodically (for example, each minute) by the CPU 31.

In the memory control process, at first, it is judged as to whether or not the amount of space (free space) of the memory area 110 is not more than a threshold value (S101: an example of a process performed by the judgment section). When the amount of space of the memory area 110 is greater than the threshold value (S101: NO), it can be judged that the amount of space of the memory area 110 is sufficiently reserved. Therefore, the memory control process is completed without saving the printing job.

When the amount of space of the memory area 110 is not more than the threshold value (S101: YES), the following situation may possibly arise. That is, when a new job is accepted, the new job can not be stored in the memory area 110. Accordingly, it is judged as to whether or not the printing job is stored in the memory area 110 (S102). When the printing job is not stored (S102: NO), the printing job which is to be the saving job is not selected. Thus, the memory control process is completed.

On the other hand, when the printing job is stored (S102: YES), the printing job, among the printing jobs stored in the memory area 110, which has the lowest priority of the printing, is selected and determined as the saving job (S103). A method for selecting the printing job which has the lowest priority of the printing is, for example, as follows. That is, the printing job, among the printing jobs stored in the memory area 110, which has the longest period of time (longest remaining time) until the print expiration date passes, is selected. The shorter the remaining time is, the shorter the period of time for printing is. Thus, there is a great risk that the printing can not be performed due to the lapse of the print expiration date. Therefore, it can be judged that the longer the remaining time is, the lower the priority of the printing is. It is noted that the determination of the saving job is not limited to the priority of the printing, for example, the saving job may be determined at random.

Next, a data transmission process in which the saving job selected at S103 is transmitted to the destination which is set in the selected saving job (S104). FIG. 4 shows a procedure of the data transmission process corresponding to S104 shown in FIG. 3.

In the data transmission process, at first, the saving information added to the saving job is referred to and it is judged as to whether or not a destination setting is made (S141). In a case that the destination setting is not made (S141: NO), the destination is automatically set as the server 300 (S151). Further, the transmission method is automatically set as a file transfer. Then, both the image information data and the image-expanded data are selected as the files which are the transmission objectives (S152, an example of a process performed by the determining section), and the pieces of data selected are transmitted to the server 300 (S153, an example of a process performed by the transmission section). After S153, the data transmission process is completed.

In a case that the destination setting is made (S141: YES), it is judged as to whether or not the transmission method is the e-mail transmission (S142). In a case that the transmission method is not the e-mail transmission (S142: NO), it is less likely to be subject to the limitation of the data size when the file is transmitted. Therefore, both the image information data and the image-expanded data are selected as the files which are the transmission objectives (S161, an example of a process performed by the determining section). Then, the pieces of data selected are transmitted to the external device which is set as the destination (S162, an example of a process performed by the transmission section). After S162, the data transmission process is completed.

In a case that the transmission method is the e-mail transmission (S142: YES), it is more likely to be subject to the limitation of the data size when the file is transmitted. Therefore, the image information data is selected as the file which is the transmission objective and the image-expanded data is not selected (S143, an example of a process performed by the determining section). Then, the selected data is transmitted by utilizing an e-mail address which is set as the destination (S144, an example of a process performed by the transmission section).

After the e-mail is transmitted, it is judged as to whether or not a transmission (delivery) error is received from an e-mail server (S145, an example of a process performed by the transmission result judgment section). In a case that the transmission error is not received (S145: NO), the data transmission process is completed. On the other hand, in a case that the transmission error is received (S145: YES), a transmission mode is changed (S171). In this embodiment, since the email transmission is unsuccessful, the transmission method is changed to the file transfer and further the destination is changed to the server 300. By changing the transmission setting, the transmission can be expected to be successful. Then, the change of the transmission mode is reported to the apparatus (PC 200 in this embodiment) from which the saving data was transmitted (S172). With this report, the user is capable of knowing that the destination, to which the printing job is saved, is changed. After S172, the selected data is transmitted to the server 300 (S153, an example of a process performed by the re-transmission section) and the data transmission process is completed.

Figure 3:
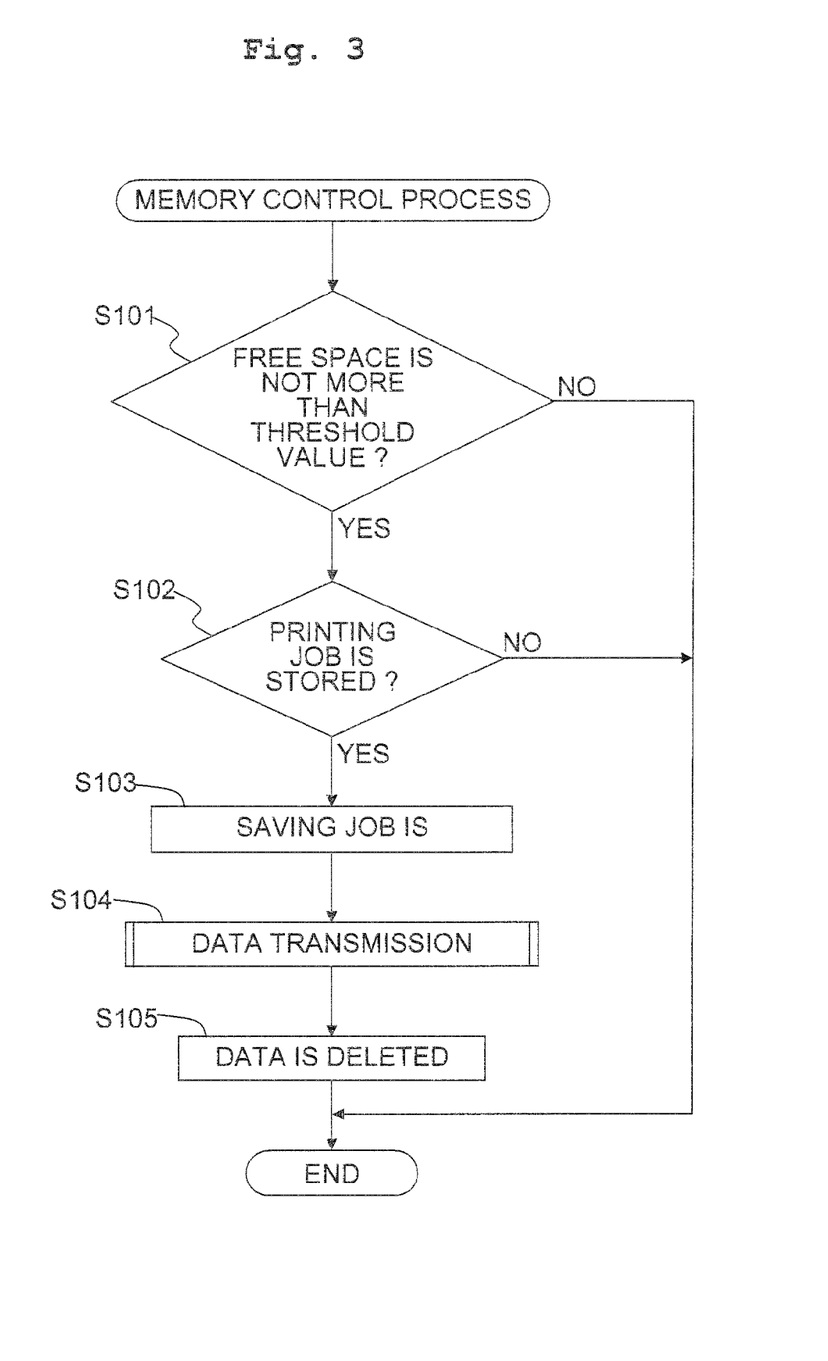
FIG. 3 is a flowchart showing a procedure of a memory control process according to the first embodiment.
Figure 4A:
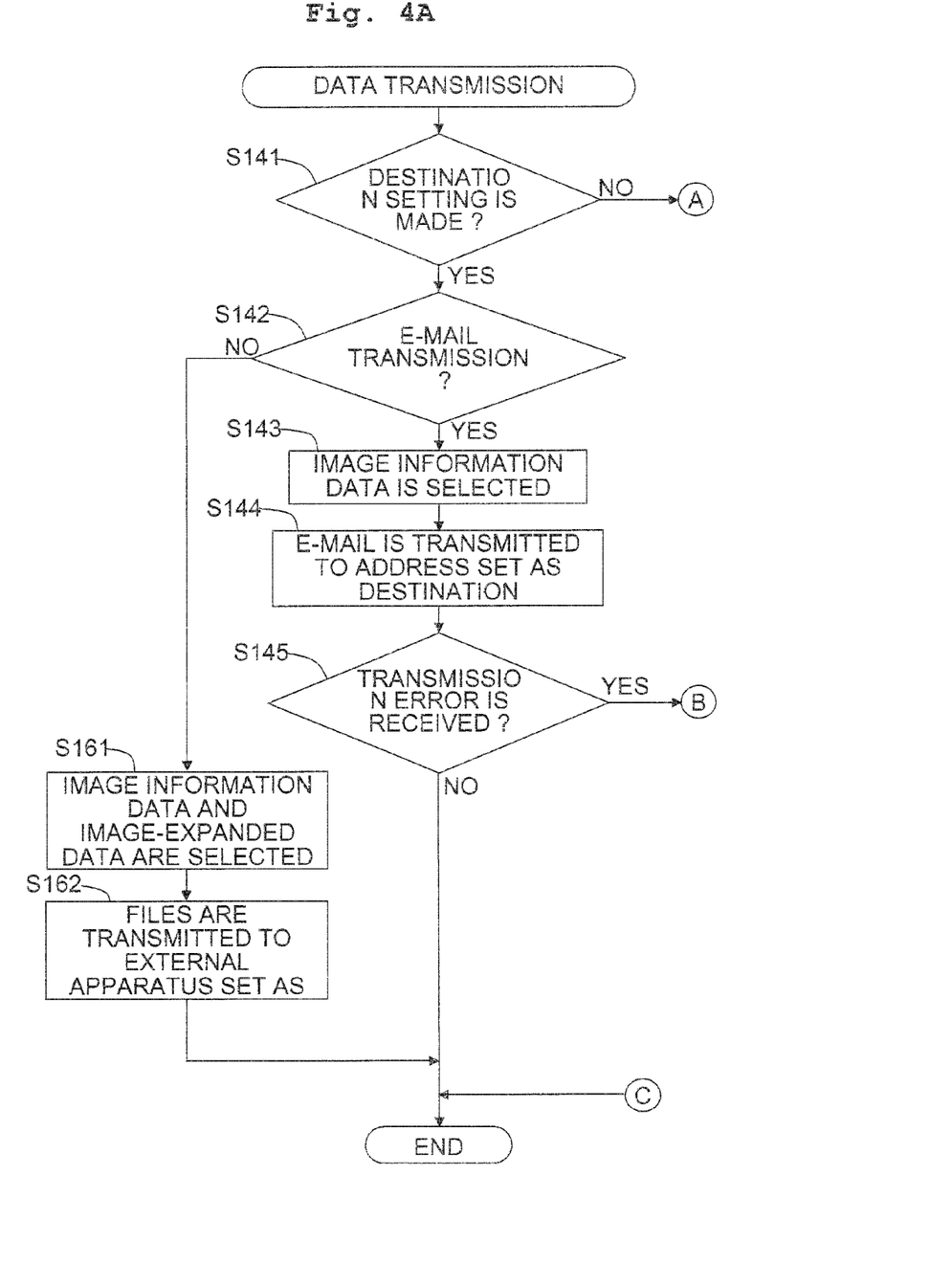
FIGS. 4A and 4B show a flowchart showing a procedure of a data transmission process according to the first embodiment.
Figure 4B:
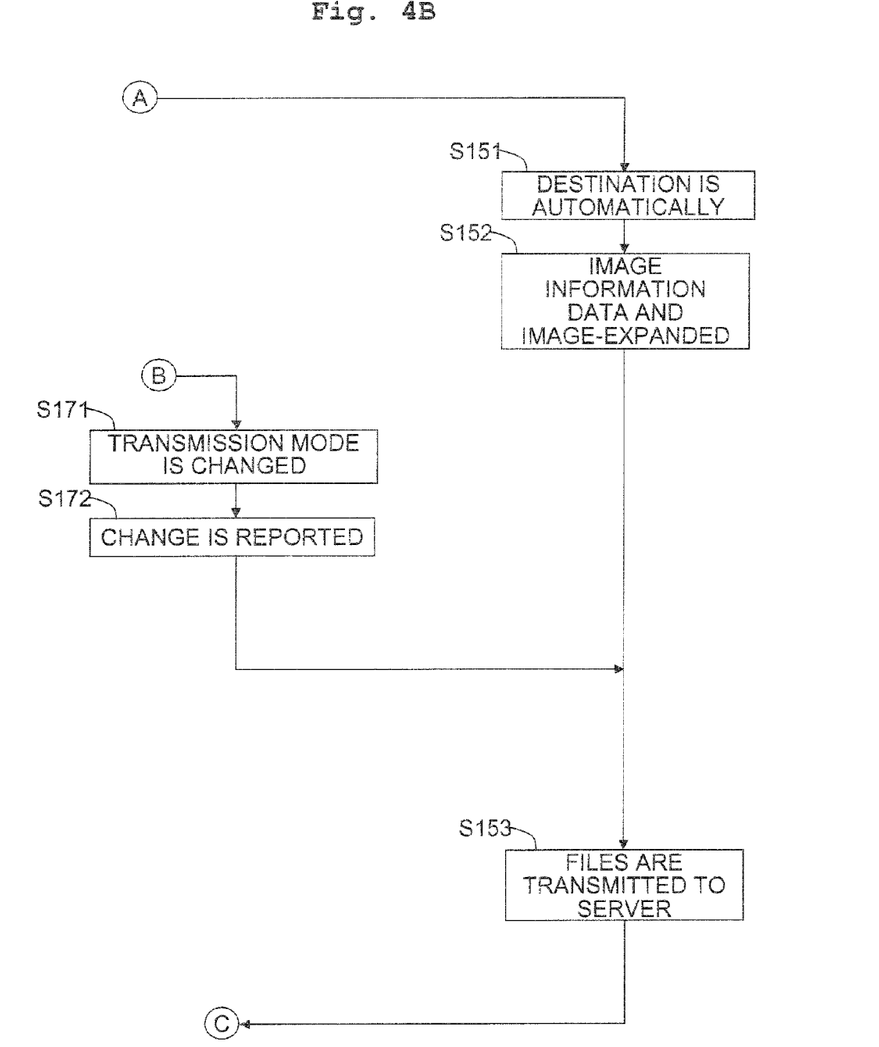

Turning back to the explanation of FIG. 3, the saving job is deleted from the memory area 110 (S105, an example of a process performed by the deleting section) after the data transmission process at S104. A mode of the deletion may be either deletion of data or permission of overwrite. After S105, the memory control process is completed.
(Time-Period Control Process)

Figure 5:
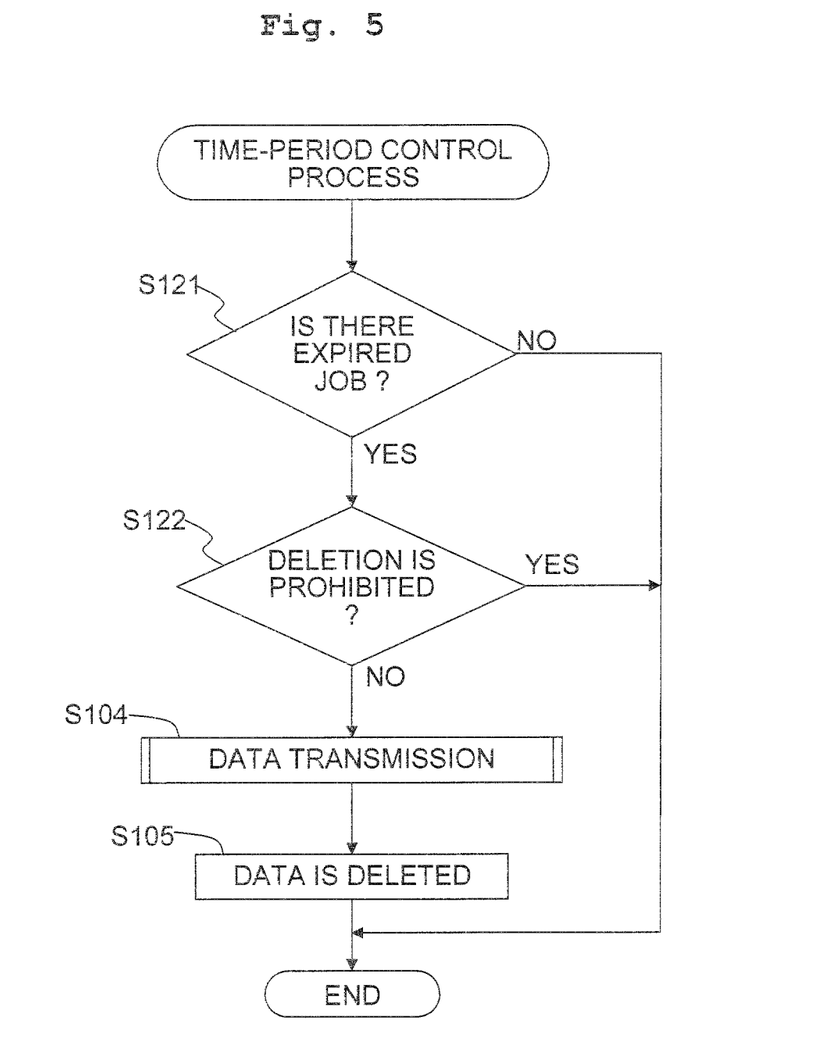
FIG. 5 is a flowchart showing a procedure of a time-period control process according to the first embodiment.

Subsequently, an explanation will be made with reference to the flowchart of FIG. 5 about the time-period control process (an example of a process performed by the judgment section, the determining section, the transmission section, and the deleting section) in which the print expiration date of the printing job stored in the memory area 110 of the printer 100 is controlled. The time-period control process is executed periodically (for example, each minute) by the CPU 31. It is noted that the processes, which are the same as or equivalent to those of the memory control process (see FIG. 3), are designated by the same reference numerals, and any explanation of which will be omitted as appropriate.

In the time-period control process, at first, it is judged as to whether or not there is the expired job in the memory area 110 (S121, an example of a process performed by the judgment section). In a case that there is no expired job in the memory area 110 (S121: NO), there is no printing job which is a control objective. Thus, the time-period control process is completed.

In a case that there is the expired job (S121: YES), the saving information which is added to the expired job is referred to and it is judged as to whether or not the deletion is prohibited (S122). The judgment as to whether or not the deletion is prohibited is performed by reference to the setting of prohibition of deletion of the saving information. In this embodiment, it is judged that the deletion is not prohibited in a case that the setting of prohibition of deletion is not made and that the saving information is not added. In a case that the deletion is prohibited (S122: YES), the time-period control process is completed without saving the expired job.

On the other hand, in a case that the deletion is not prohibited (S122: NO), the data transmission process, in which the expired job (saving job in this process) extracted at S121 is transmitted to the destination set in the saving job, is performed (S104, an example of a process performed by the determining section, the transmission section). After the saving job is transmitted, the saving job is deleted from the memory area 110 (S105, an example of a process performed by the deletion section). After S105, the time-period control process is completed.

In the printer 100 of the first embodiment, the transmission content is changed depending on the transmission setting of the printing job, when the printing job (saving job), which is to be deleted before the printing instruction is accepted due to the shortage of the amount of space of the memory area or the lapse of the print expiration date, is transmitted to the external device. That is, in the case of the e-mail transmission, the image-expanded data is not allowed to be the transmission objective and the data size of the data to be transmitted is made to be small to increase the success rate of the transmission. On the other hand, in a case that the saving job is transmitted via any transmission means other than the e-mail, the success rate of the transmission is not greatly decreased even when the data size of the data to be transmitted is great. Thus, the image-expanded data is also allowed to be the transmission objective. By saving the image-expanded data in addition to the image information data, it is possible to cut out the need of re-creating the image-expanded data from the image information data when the saving job is reused.

In this embodiment, the transmission content is changed depending on whether or not the e-mail transmission is used. However, the present teaching is not limited thereto. For example, the transmission content may be changed depending on whether or not the destination apparatus is a smartphone (high-functional mobile phone) or whether or not the wireless communication is utilized in the data transmission. That is, in a case that the destination apparatus has a small amount of memory or that the communication in the destination apparatus is unstable, it is preferable that the data size of the data to be transmitted is made to be small to avoid the transmission error.

Second Embodiment

Figure 6:
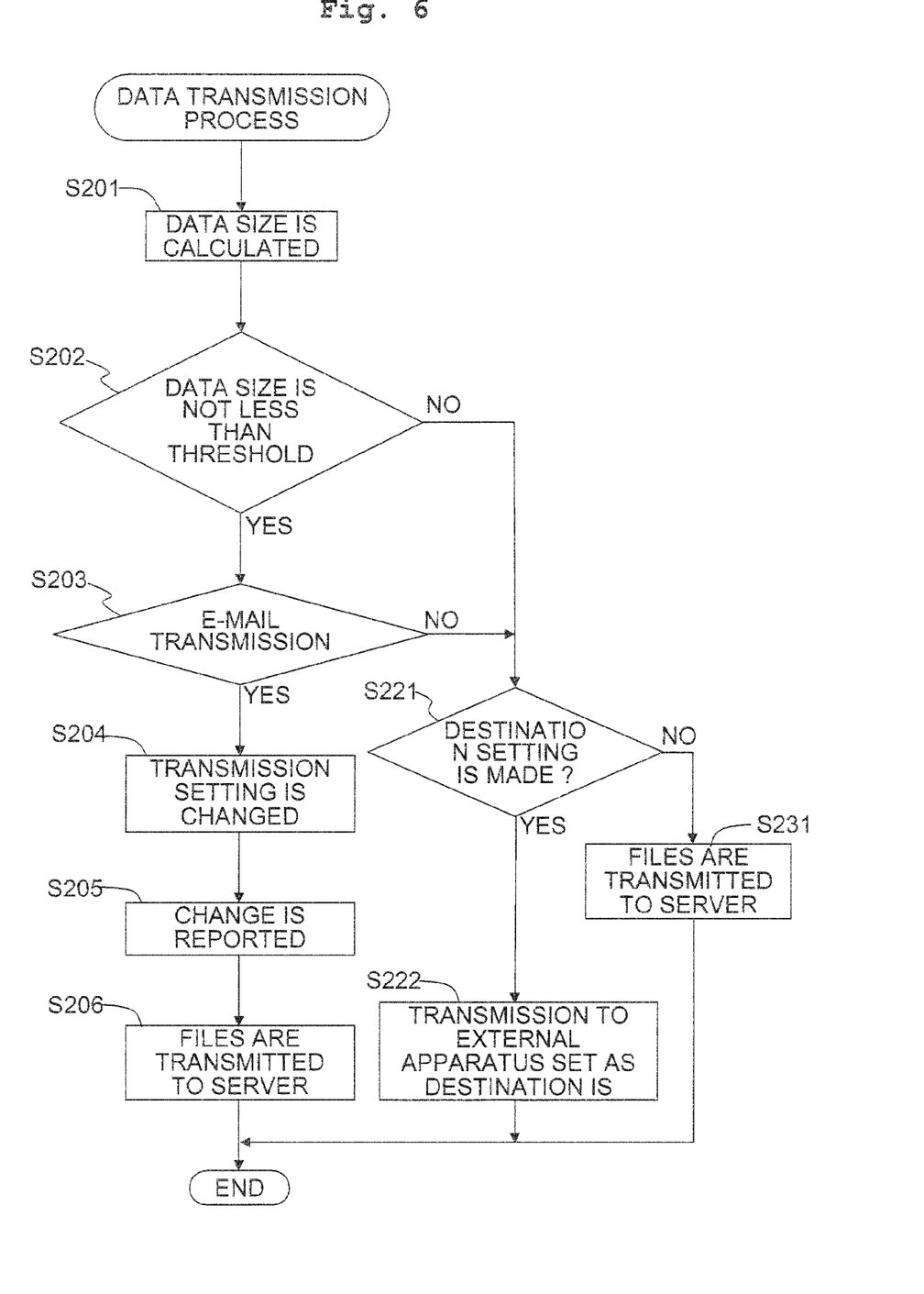
FIG. 6 is a flowchart showing a procedure of the data transmission process according to the second embodiment.

Subsequently, an explanation will be made with reference to the flowchart of FIG. 6 about another control method of the data transmission process corresponding to S104 shown in FIG. 3 as described above. In the data transmission process of the second embodiment, the transmission setting is changed depending on the transmission content. In this regard, the second embodiment is different from the first embodiment in which the transmission content is changed depending on the transmission setting.

In the data transmission process of the second embodiment, at first, the total data size (entire data size) of the data to be transmitted is calculated (S201). In this embodiment, since the image information data and the image-expanded data are stored for each printing job, the sum of the data size of the image information data and the data size of the image-expanded data is calculated.

Next, it is judged as to whether or not the data size calculated at S201 is not less than the threshold value (S202). In a case that the data size is smaller than the threshold value (S202: NO), there is a low possibility of causing the transmission error due to the data size. Then, it is judged as to whether or not the destination setting is made (S221). In a case that the destination setting is made (S221: YES), the image information data and the image-expanded data are transmitted in accordance with the transmission setting (S222). In a case that the destination setting is not made (S221: NO), the image information data and the image-expanded data are transmitted to the server 300 (S231). After the transmission of the data (S222 or S231), the data transmission process is completed.

On the other hand, in a case that the data size is not less than the threshold value (S202: YES), there is a high possibility of causing the transmission error due to the data size. Then, it is judged as to whether or not the transmission method is the e-mail transmission (S203). In a case that the setting of the e-mail transmission is not made (S203: NO), there is the low possibility of causing the transmission error due to the data size. Thus, the process is shifted to S221 to perform the data transmission in accordance with the transmission setting.

In a case that the setting of the e-mail transmission is made (S203: YES), the transmission setting is changed (S204, an example of a process performed by the judgment section). In particular, the destination is changed to the server 300 and the transmission method is changed to the file transfer. Then, the change of the transmission setting is reported to the apparatus from which the saving data was transmitted (S205). With this report, the user is capable of knowing that the destination, to which the printing job is saved, is changed. After S205, the image information data and the image-expanded data are transmitted to the server 300 (S206, an example of a process performed by the transmission section) and the data transmission process is completed.

In the printer 100 of the second embodiment, the transmission setting is changed depending on the transmission content when the printing job is transmitted to the external device. That is, when the data size of the data to be transmitted is not less than the threshold value, the destination and the transmission method are changed. The e-mail transmission is not used as the transmission method, thereby decreasing the limitation of the date size at the time of the transmission to increase the success rate of the transmission. On the other hand, when the data size of the data to be transmitted is small, since the success rate of the transmission is not decreased greatly, the e-mail transmission is performed. Accordingly, it is possible to realize the transmission mode desired by the user.

In this embodiment, the transmission setting is changed depending on the data size of the transmission data. However, the present teaching is not limited thereto. For example, the transmission setting may be changed depending on whether or not the number of data to be transmitted is not less than the threshold value. That is, when the number of data is large, it can be expected that the data size is large. Therefore, it is preferable that the transmission method is changed to avoid the transmission error.

As described in detail above, the printer 100 in this embodiment determines the transmission mode, which is appropriate for the printing job, based on at least one of the transmission setting and the transmission content, when the saving job (an example of a deletion-objective job) which is required to be deleted before the printing instruction is accepted due to the shortage of the amount of space of the memory area or the lapse of the print expiration date, is transmitted to the external device. Accordingly, it is possible to reduce a risk for causing the transmission error of the printing job.

It is noted that this embodiment is a mere example, and is not intended to limit the present teaching in any way. Accordingly, as a matter of course, the present teaching may be improved and/or modified in other various forms without deviating from the gist or essential characteristics of the present teaching. For example, the present teaching is not limited only to the printer, and is applicable to any apparatus or device provided at least with a printing function, such as multifunction machines and copy machines. Further, the information process apparatus through which the printing job is entered into the printer is not limited to the personal computer. For example, the information process apparatus may be mobile terminals such as the smartphone.

Further, in this embodiment, the printing of the printing job stored in the printer is started by the panel operation. However, the present teaching is not limited thereto. For example, the printing may be started when the printing instruction from the mobile terminal is accepted or when authentication of a card reader etc. is made.

Further, in this embodiment, the printing job is directly transmitted to the printer 100 from the PC 200. However, the present teaching is not limited thereto. For example, the printing job may be transmitted to the printer 100 from the PC 200 via the server 300.

Further, any one of S141 and S142 of the data transmission process (FIG. 4) of the first embodiment may be replaced with S202 of the data transmission process (FIG. 6) of the second embodiment. In a case that S141 is replaced with S202 and that the data size is not less than the threshold value (S202: YES), the process proceeds to S151. In the case that S141 is replaced with S202 and that the data size is less than the threshold value (S202: NO), the process proceeds to S142. In a case that S142 is replaced with S202 and that the data size is not less than the threshold value (S202: YES), the process proceeds to S143. In the case that S142 is replaced with S202 and that the data size is less than the threshold value (S202: NO), the process proceeds to S161. Furthermore, S122 of the time-period control process (FIG. 5) of the first embodiment may be omitted.

Further, the order of S202 to S203 in the data transmission process (FIG. 6) of the second embodiment may be reversed. Furthermore, only one of S202 and S203 may be performed.

What is claimed is:

1. A printing apparatus which is configured to communicate with an external device and performs printing, the apparatus comprising:
   a receiving section which receives a printing job from the external device;
   a storage section in which the printing job received by the receiving section is stored;
   an input section which accepts a printing instruction to perform the printing based on the printing job stored in the storage section;
   a printing section which performs the printing based on the printing job stored in the storage section in a case that the input section accepts the printing instruction;
   a judgment section which judges as to whether or not the printing job stored in the storage section is a deletion-objective job which is to be deleted from the storage section before the input section accepts the printing instruction;
   a determining section which makes a determination of a transmission mode, from among a plurality of transmission modes for transmitting the deletion-objective job, based on at least one of a transmission setting and a transmission content of the deletion-objective job, in a case that the judgment section judges that the printing job stored in the storage section is the deletion-objective job;
   a transmission section which performs a transmission of the deletion-objective job to the external device in accordance with the determination of the determining section; and
   a deleting section which deletes the deletion-objective job, which is transmitted by the transmission section, from the storage section;
   wherein the determining section determines a file format of a printing data included in the deletion-objective job as the transmission mode;
   wherein the printing job stored in the storage section includes an image information data which is not yet expanded and an image-expanded data which has been expanded; and
   the determining section determines as to whether the transmission section transmits the image information data of the deletion-objective job or the transmission section transmits the image information data and the image-expanded data of the deletion-objective job as the transmission mode.

2. The printing apparatus according to claim 1, wherein the judgment section judges that the printing job is the deletion-objective job in a case that a free space of the storage section is not more than a predetermined value.

3. The printing apparatus according to claim 1, wherein the judgment section judges that the printing job is the deletion-objective job in a case that a print expiration date of the printing job stored in the storage section passes.

4. The printing apparatus according to claim 1, wherein the determining section determines the transmission content of the deletion-objective job depending on the transmission setting of the deletion-objective job.

5. The printing apparatus according to claim 1, wherein the determining section determines the transmission setting of the deletion-objective job depending on the transmission content of the deletion-objective job.

6. The printing apparatus according to claim 1, further comprising:

a transmission result judgment section which judges as to whether or not the transmission by the transmission section is successful; and a re-transmission section which performs a change of the transmission mode of the deletion-objective job to retransmit the deletion-objective job in accordance with the transmission mode after the change, in a case that the transmission result judgment section judges that the transmission by the transmission section is unsuccessful.

7. The printing apparatus according to claim 1, wherein after the deletion-objective job is transmitted by the transmission section, the deletion section deletes, from the storage section, both the image information data and the image-expanded data of the deletion-objective job.

8. The printing apparatus according to claim 1, further comprising a reporting section which reports, in a case that the determining section determines a new destination of the deletion-objective job, the new destination determined by the determining section to a user of the deletion-objective job.

* * * * *